UNITED STATES PATENT OFFICE.

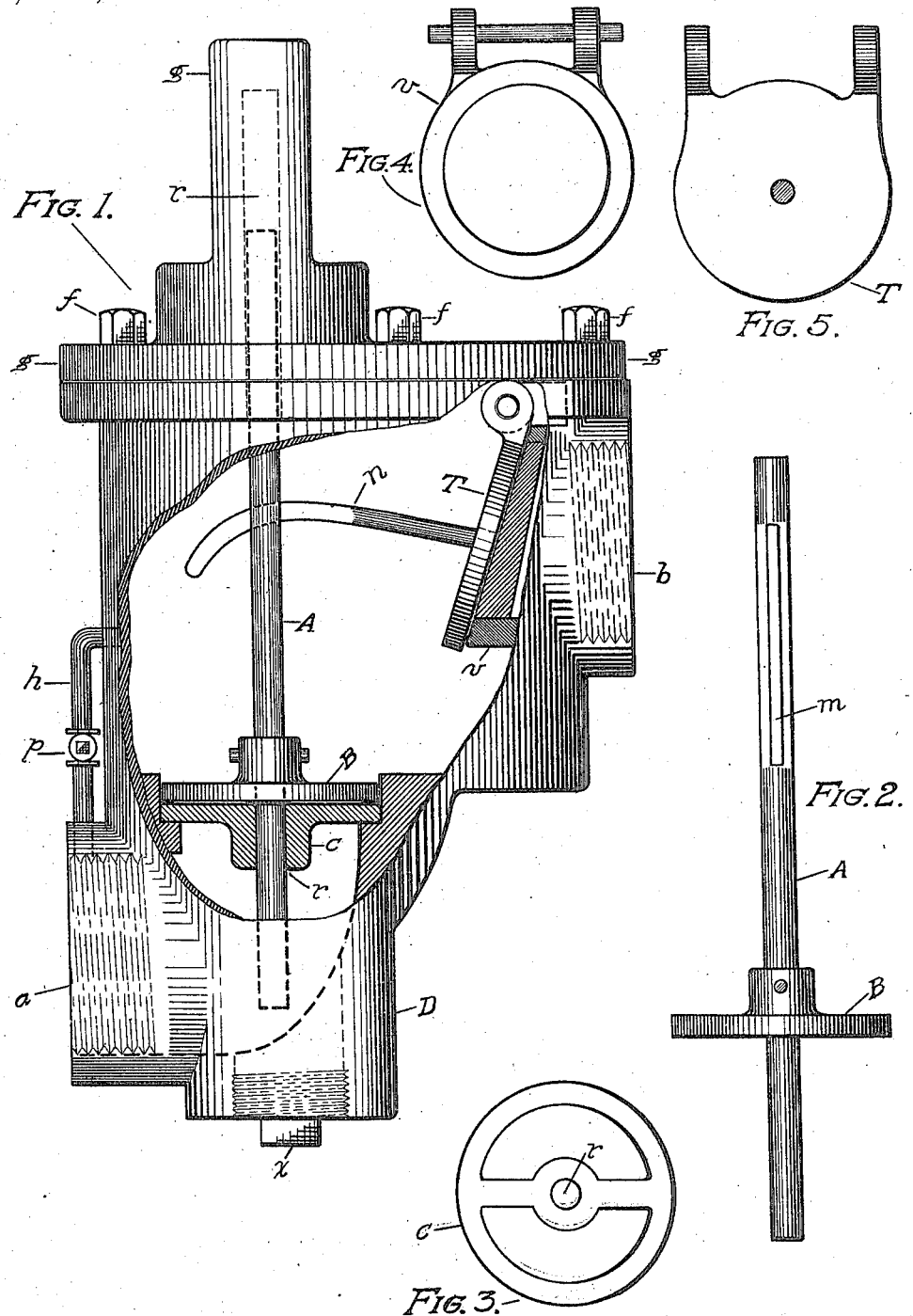

MARTIN J. LOFTUS, OF INDEPENDENCE, KANSAS.

AUTOMATIC VALVE.

1,152,192. Specification of Letters Patent. Patented Aug. 31, 1915.

Application filed May 16, 1914. Serial No. 839,000.

*To all whom it may concern:*

Be it known that I, MARTIN J. LOFTUS, a citizen of the United States, residing at Independence, Montgomery county, State of Kansas, have invented certain new and useful Improvements in Automatic Valves; and I do hereby declare the following to be a full, clear, and exact description of the invention, such as will enable others skilled in the art to which it appertains to make and use the same.

The object of my invention is to provide an automatic valve designed to keep oil and fluid from gravitating from the higher elevated tanks to the lower tanks, when two or more tanks are connected together by pipes as is usual in the oil fields where this invention is especially designed to be used on gathering lines from the different leaseholds by the pipe-line companies; to provide a valve which acting automatically will prevent the tank from being run over when a tank at a higher elevation is being run; also when all fluid is out of the connections, to shut off the tank and close the line so as to prevent air from getting into the line; to prevent the gravity of fluid from the other tanks. Where pumps are used to pump out the oil on slow gravity lines this valve will shut off automatically when pressure comes on the gravity line, also will prevent air from getting into the line after the oil and fluid is taken out.

The apparatus involves two consecutive valves in the same passage, each of the valves opening in the direction toward the other, each capable of slight independent opening and adjustment; in certain ways these valves act with each other, and in other ways work independently of each other.

In the accompanying drawings, Figure 1 is an axial sectional view through the valve mechanism. Fig. 2 is the lower valve with stem and slot in the stem. Fig. 3 is a plan view of the lower valve seat. Fig. 4 is a plan view of the upper valve seat. Fig. 5 is a plan view of the upper valve.

In the drawings A represents the lower valve stem, and $m$ the slot in the lower valve stem.

B is the lower valve, and $a$ is the end of the conduit where the fluid is to enter, pass up through the valve seat C which is inserted in the conduit $a$ $b$. The fluid will then raise the valve B which valve is rigidly secured to the valve stem A, and thus will lift up the outer end of the arm $n$, which arm being rigidly attached to the valve T will raise valve T open, the arm $n$ being designed to extend through a slot in the valve stem A so that when the stem A is raised it will necessarily raise the arm $n$. Lugs or other means may be used on the stem A to raise the arm $n$ and still be in the spirit of my invention.

$g$ is a casing cap attached to the valve casing D by the ordinary bolts and taps $f$. The valve seat C has a guideway $r$ for the lower part of the valve stem A through the valve seat C, and there is directly above the valve seat C a guideway $r$ for the upper end of the valve stem A provided in the casing cap $g$. These guideways $r$ are of such length as to provide sufficient room for the valve stem A and valve B to be raised and lowered the desired distance to allow fluid to pass through the valves and to also close and stop the flow by coming in contact with the valve seats.

The valve T, the upper valve, is designed to be pivoted at one side over the upper valve seat $v$ in such a manner that when the outer end of the arm $n$ is raised it will open the valve T. The slot $m$ in the valve stem A is designed to be of such length that the valve T may open and close independently of the valve B when the valve B is in a closed position; and valve B may open and close independently of the valve T when the valve T is open. These valves are designed to operate entirely automatically by the fluid and the pressure in the conduit.

$x$ is the ordinary cap or plug for closing opening below valve seat C in the valve casing D. Thus liquid coming in the conduit at $a$ will pass through the valve seat C and against the valve B, force up the valve B which will thus force up and open the valve T by means of it being pivoted at one side thereof, and having the rigidly extending arm $n$ working in the slot $m$ of the stem A. Thus fluid, air or steam coming from the direction of $a$ to $b$ in the conduit will pass through both valves. However should the fluid come from $b$ toward the valve T it will raise valve T, and flow in above the valve B and force the valve B shut; or should there be a vacuum or suction on the line or in the conduit toward $b$ then this will draw down the valve T on the seat $v$ and the arm $n$ acting on the valve stem A will force valve B in position on the valve seat C, the air being allowed to pass through pipe h by check valve p, thus preventing air from being sucked into the line.

Having thus described my invention, what I claim is:

1. The combination with a valve casing, of two valves located at successive points in the passage through the casing, one valve opening in one direction, the other valve opening back toward it, two valve seats, a valve stem rigidly attached to one of the valves, a slot in the valve stem, a rigid arm attached to the other valve and designed to work in the slot of the valve stem, an air pipe connecting the inlet chamber with the chamber above the valves and a check valve designed to control the air passing through the air pipe.

2. The combination with a valve-casing of a valve seat having pivotally attached at one side thereof a valve, a rigid arm on the pivoted valve, a valve-stem, a slot in the valve stem, a guideway in the casing and a guideway in the valve seat for the ends of the valve stem, a valve rigidly attached to the valve stem, a valve seat for this valve to close against, a casing cap, means for securing the casing cap to the valve casing, a closing plug in the valve casing, with an air pipe designed to connect the inlet chamber with the chamber above the valves and a check valve in the air pipe designed to control the air passing through the air pipe.

MARTIN J. LOFTUS.

Witnesses:
R. MORRISON,
O. S. O'BRIEN.

Copies of this patent may be obtained for five cents each, by addressing the "Commissioner of Patents, Washington, D. C."